(12) United States Patent
Evans et al.

(10) Patent No.: US 6,576,524 B1
(45) Date of Patent: Jun. 10, 2003

(54) METHOD OF MAKING A PRISMATIC CAPACITOR

(75) Inventors: David A. Evans, East Providence, RI (US); Ross Blakeney, Ontario (CA)

(73) Assignee: Evans Capacitor Company Incorporated, East Providence, RI (US)

( * ) Notice: Subject to any disclaimer, the term of this patent is extended or adjusted under 35 U.S.C. 154(b) by 13 days.

(21) Appl. No.: 09/909,128

(22) Filed: Jul. 20, 2001

(51) Int. Cl.[7] ................................................ H01L 21/20
(52) U.S. Cl. ...................... 438/381; 438/121; 438/171; 438/225; 438/381; 438/386; 438/387; 438/393; 438/396; 438/572; 438/575; 361/381; 361/389; 361/517; 361/522; 361/525; 361/526; 361/535; 361/541
(58) Field of Search ................................ 438/386, 387, 438/121, 171, 225, 381, 393, 396, 572, 575; 361/526, 525, 532, 381, 389, 517, 522, 535, 541

(56) References Cited

U.S. PATENT DOCUMENTS

| | | | |
|---|---|---|---|
| 5,469,325 A | * 11/1995 | Evans | 361/526 |
| 5,850,331 A | * 12/1998 | Matsumoto et al. | 361/502 |
| 5,968,209 A | * 10/1999 | Kono | 29/25.03 |
| 6,042,624 A | * 3/2000 | Breyen et al. | 29/25.03 |

* cited by examiner

*Primary Examiner*—Richard Elms
*Assistant Examiner*—Pho M. Luu
(74) *Attorney, Agent, or Firm*—Leydig, Voit & Mayer, Ltd.

(57) ABSTRACT

A method of making a flat capacitor includes forming at least one recess on an inside surface of a metal foil blank, leaving a surrounding peripheral flange. A coating performing as an electrode of the capacitor is applied to the inside surface of the metal foil blank and an ion-permeable separator is placed on that inside surface of the metal foil blank. A substantially planar anode with a protruding lead is placed in the recess with the lead extending through a hole of the metal foil blank. Thereafter, the metal foil blank is folded along a line intersecting the hole so that the anode is sandwiched between parts of the separator and the separator is in contact with the coating on the inside surface of the metal foil blank. In the folding process, parts of the peripheral flange of the metal foil blank are brought into contact with each other and these parts are sealed to each other to form a hermetically sealed metal foil case of the capacitor.

8 Claims, 4 Drawing Sheets

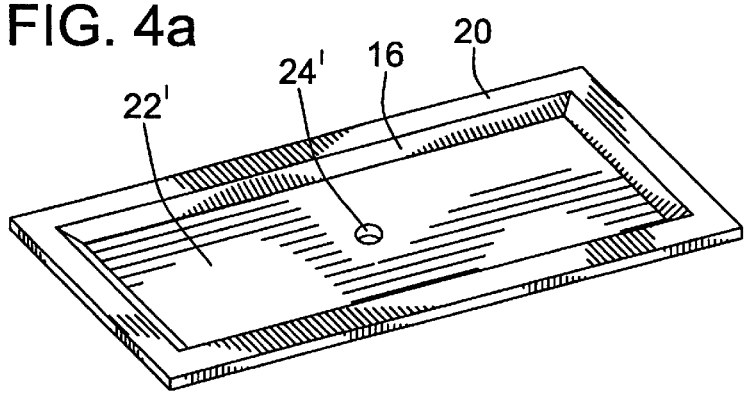
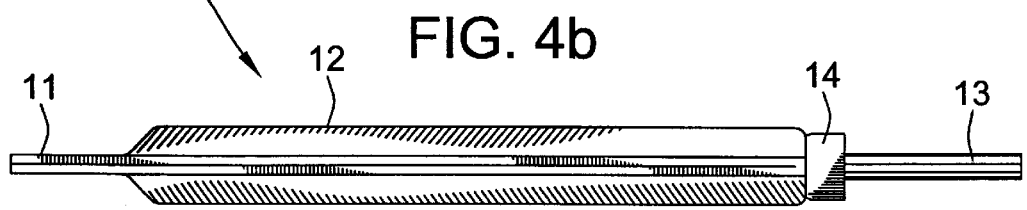

METHOD OF MAKING A PRISMATIC CAPACITOR

TECHNICAL FIELD

The invention is directed to a prismatic capacitor, particularly to a very thin capacitor. The invention is particularly useful with electrolytic capacitors and especially with hybrid capacitors combining characteristics of electrochemical and wet slug capacitors.

BACKGROUND OF THE INVENTION

Wet slug capacitors typically employing anodes made from valve metals bearing an oxide coating of the valve metal are well known. These conventional wet slug electrolytic capacitors are available in numerous sizes, both in terms of physical size and shape, the traditional shape being cylindrical. The anodes of typical wet slug capacitors are usually one of tantalum, aluminum, niobium, zirconium, or titanium, all metals that form a native oxide and in which the native oxide can be electrolytically increased in thickness. These wet slug capacitors have relatively high breakdown voltages but their energy storage density is relatively low.

Another kind of capacitor, typically referred to as an electrochemical capacitor, employs electrodes of porous metal oxides with the metal usually selected from the group consisting of ruthenium, iridium, nickel, rhodium, platinum, palladium, and osmium. These electrochemical capacitors have relatively high energy storage densities but relatively low breakdown voltages.

The advantages of wet slug capacitors and electrochemical capacitors can be combined to provide capacitors with relatively high breakdown voltages and relatively high energy storage densities, as described in U.S. Pat. Nos. 5,369,547, 5,469,325, and 5,754,394, the disclosures of which are incorporated herein by reference. Examples of such capacitors having various shapes, including cylindrical and relatively flat capacitor cells, are disclosed in those patents. Typically, in the flat or cubic capacitors, mutually electrically isolated electrodes are disposed at opposite sides of the capacitor package with, possibly, an anode between the electrodes. Assembly of those flat capacitors requires bonding of numerous elements and an insulating seal impervious to an electrolyte between the two electrodes. The complexity of these capacitors complicates their assembly and increases their cost.

SUMMARY OF THE INVENTION

It is an object of the present invention to provide a thin capacitor that is relatively flat, yet provides high energy storage density, high breakdown voltage, and is simple in construction and low in production cost.

It is a further object of the invention to provide a method of making such a capacitor.

A capacitor according to the invention includes a generally planar anode having two opposed faces, a lead wire, and a resilient body surrounding a part of the lead wire; an ion-permeable separator wrapped around and contacting the faces of the anode, the lead wire protruding through the separator; an electrolyte permeating the separator; and a one-piece metal foil case including at least one recess having an inside surface coated with a coating for forming a capacitor with the anode, the coating being in contact with the separator, the metal foil having a fold along one side of the capacitor that contains a hole in which the resilient body is disposed in a liquid-tight seal with the metal foil case, and peripheral parts extending around the case from the fold and that include a sealed seam of surfaces of the metal foil, hermetically sealing the electrolyte, the separator, and the anode within the metal foil case.

A method of making a capacitor according to the invention includes providing a metal foil blank having an inside surface, an outside surface, and at least one edge; forming two substantially similar recesses on the inside surface of the metal foil blank, leaving a peripheral flange surrounding the recesses at the edge of the metal foil blank; before or after forming the recesses, coating the inside surface of the metal foil with a coating for forming an electrode of a capacitor; before or after applying the coating, forming a hole in the metal foil blank spaced from the edge and between the two recesses; placing an ion-permeable separator on the inside surface of the metal foil blank; before or after placing the ion-permeable separator on the inside surface of the metal foil blank, adding an electrolyte to the separator; preparing an assembly of a substantially planar anode having an area no larger than the area of the two substantially similar recesses and a lead connected to the anode; inserting the lead through the separator and the hole; placing a resilient body on and surrounding part of the lead proximate the anode and inserting the body into the hole in the metal foil blank; folding the metal foil blank along a line intersecting the hole and lying between the two recesses so that the anode is sandwiched between the separator and the separator is in contact with the coating on the inside surface of the metal foil in the recesses, bringing parts of the peripheral flange of the metal foil blank into contact with each other; and sealing the parts of the peripheral flange of the metal foil blank that are in contact with each other to form a hermetically sealed metal foil case.

BRIEF DESCRIPTION OF THE DRAWINGS

FIGS. 4a and 4b depict an alternative embodiment of a capacitor according to the invention.

SPECIFIC DESCRIPTION OF THE INVENTION

Figure 1:
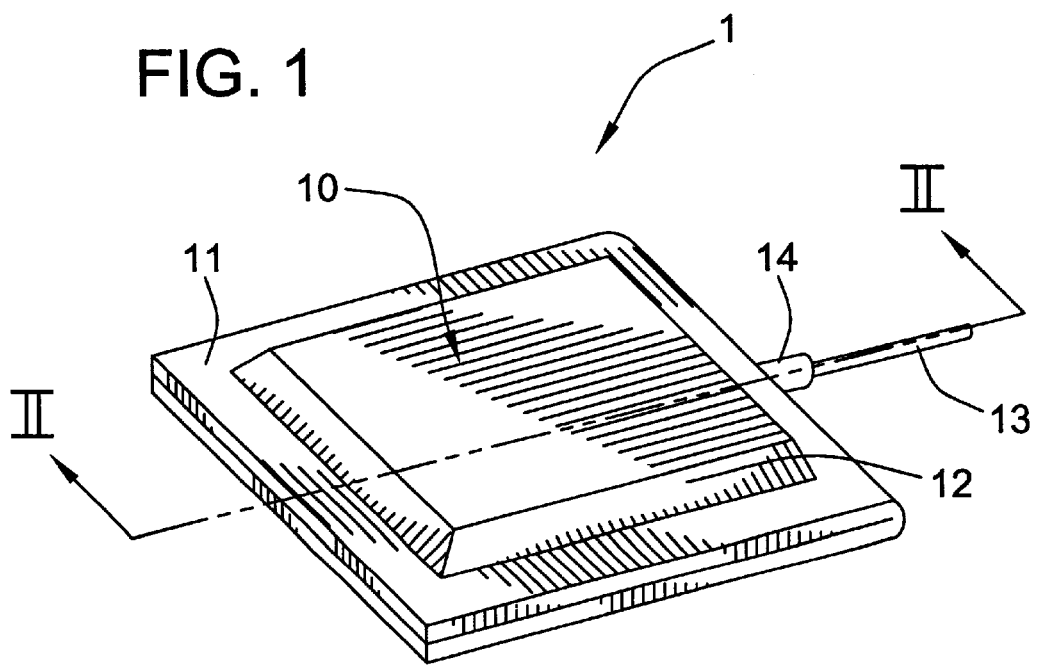
FIG. 1 is a perspective view of an embodiment of a capacitor according to the invention.
Figure 2:
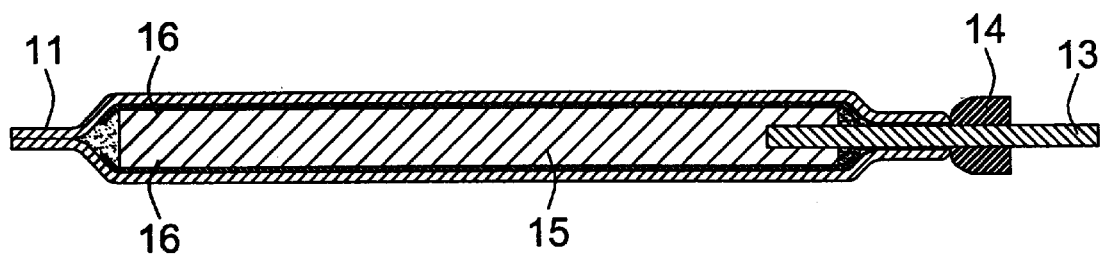
FIG. 2 is a cross-sectional view of the capacitor of FIG. 1 taken along line II—II of FIG. 1.

FIG. 1 is a perspective view of a prismatic capacitor 1 according to an embodiment of the invention. FIG. 2 is a cross-sectional view of that embodiment taken along line II—II of FIG. 1. The capacitor embodiment 1 includes a metal case 10. That metal case is preferably tantalum or another metal that is tough yet malleable, easily bent, and to which an electrical contact can be readily made. In addition, the metal should be easily susceptible to coating with a typical coating material used in an electrochemical capacitor, such as ruthenium oxide. In addition to tantalum, examples of such metals include aluminum, stainless steel, nickel, titanium, niobium, and zirconium. The metal case has a prismatic shape and, in the illustrated embodiment, an essentially rectangular shape in plan view, with an extending anode lead.

The case 10, in the depicted embodiment, includes four relatively thin peripheral regions at the edges of the rectangularly shaped capacitor. At three of the regions, there is a joint between surfaces of the case 10 that are welded or otherwise joined to each other. The fourth region, as explained further below, is seamless and is the result of folding of the single piece of metal forming the case 10. In other words, the case 10 is preferably a single metal sheet that, after the process as described below, is folded onto itself. The surfaces of the metal that are brought into contact by the folding produce the peripheral region 11. The peripheral region 11 is hermetically sealed by welding together the two metal surfaces that are brought into mutual contact by folding.

In the depicted capacitor embodiment 1, the metal case includes two oppositely directed projecting volumes 12. Only one of the volumes is visible in FIG. 1. These two volumes 12 provide an interior space within the capacitor for receiving the capacitor parts, i.e., the anode, separator, and electrolyte, as described below. While the depicted embodiment includes two such volumes, one on each of the sides of the peripheral region 11 along a direction perpendicular to the peripheral region, a single such volume on only one side of the peripheral region could be used in a capacitor according to the invention.

Along the side of the capacitor 1 where there is a fold in the metal case 10, a lead 13 projects from the capacitor. This lead provides an electrical connection to the anode within the capacitor. The lead 13 passes through an elastomeric body 14 to the interior of the capacitor case 10. A portion of the elastomeric body 14 is compressed or pinched by the metal case 10 of the capacitor 1. As explained below, the elastomeric body 14 is inserted into and disposed in a hole in the metal foil that forms the case 10. The elastomeric body 14 is compressed in the folding process described later to form a seal with the metal foil that prevents leakage of electrolyte from within the capacitor.

An anode, preferably a conventional wet slug capacitor anode 15, is disposed within the case 10 of the capacitor 1 and is in electrical contact with the lead 13. The anode 15 is separated from the inside surface of the case 10 and prevented from direct electrical and mechanical contact with the case 10 by a separator 16. The separator is preferably an ion permeable material that permits current flow for charging and discharging of the capacitor and prevents short circuiting of the anode to the inside of the metal case 10. An electrolyte is present the remaining space inside the metal case 10. The electrolyte provides electrical transport for ions between the anode 15 and the metal case 10 for discharging and charging of the capacitor.

Most preferably, the inside surface of the case 10 is not the directly exposed metal of the case 10. Rather a thin coating of a porous oxide of a metal selected from the group consisting of ruthenium, iridium, nickel, rhodium, platinum, palladium, and osmium is present on the inside surface of the case 10, at least at the volumes 12. This porous oxide coating, typically employed in electrochemical capacitors, substantially increases the capacitance of the capacitor and interacts with the valve metal anode 15 to produce a capacitor having the high energy storage density associated with electrochemical capacitors and the relatively high voltage breakdown associated with wet slug capacitors. The valve metal anode 15 is preferably a metal chosen from the group consisting of tantalum, aluminum, niobium, zirconium, and titanium, all metals that form native oxides that may be increased in thickness electrolytically to produce desired electrical characteristics.

In a preferred embodiment of the invention, the metal case 10 may be a tantalum foil about 0.1 mm in thickness. A ruthenium oxide coating may be formed on one side of the foil using techniques known in the art. The separator 16 may be a material, such as NAFION®, paper, or a non-woven glass or polyolefin fiber sheet, for example, about 0.1 mm thick. A preferable, known, electrolyte for such capacitors is sulfuric acid which may be thickened by the addition of fumed silica. A preferable anode is a tantalum pellet having a surface covered by a native oxide increased in thickness by a known electrolytic process. For example, tantalum powder can be sintered at a high temperature to form a relatively thin, i.e., about 1 mm thick, rectangular pellet. An electrochemical oxide may be formed on the tantalum pellet in an electrolytic cell with a phosphoric acid solution to prepare the anode 15. The elastomeric body 14 can be any elastomeric material that can withstand the electrolyte, such as sulfuric acid. A preferred material for the body 14 is VITON®.

Figure 3A:
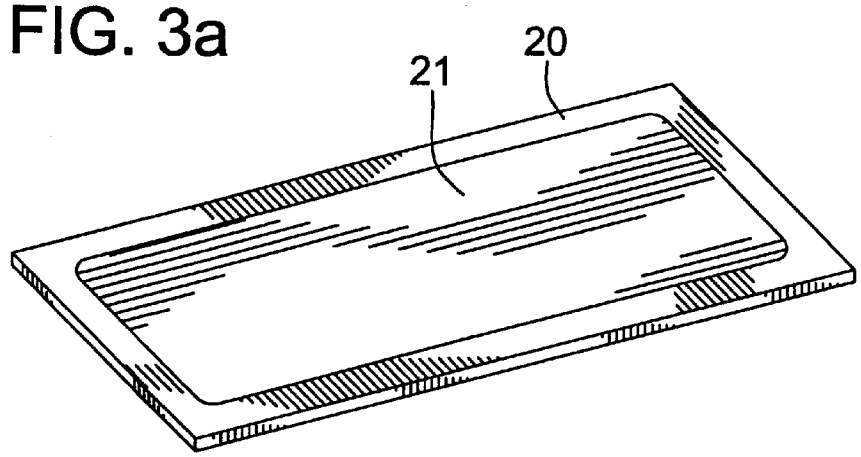
FIGS. 3a–3g are views illustrating steps in a method of making the capacitor embodiment illustrated in FIGS. 1 and 2.

A method of manufacturing a capacitor according to the invention is illustrated in FIGS. 3a–3g. Initially, as shown in FIG. 3a, a metal blank 20 is provided for making the capacitor case 10. (The figures are not drawn to scale so that their features can be easily comprehended.) The blank illustrated is rectangular in shape but the invention is not limited to a blank having a particular shape. For example, any shape that includes a line of symmetry along which the blank can be folded to provide surfaces in mutual contact for joining at a seam to make a closed package can be used. However, rectangular shapes are particularly advantageous since metals, such as tantalum foil, are supplied in a ribbon or generally rectangular shaped pieces. While non-rectangular shapes could be cut from this ribbon, they would result in wasted materials. If a metal foil is available in a different shape or already cut into discrete shapes so that no waste occurs, the invention can be readily employed to provide relatively thin capacitors with a variety of shapes.

Figure 3B:
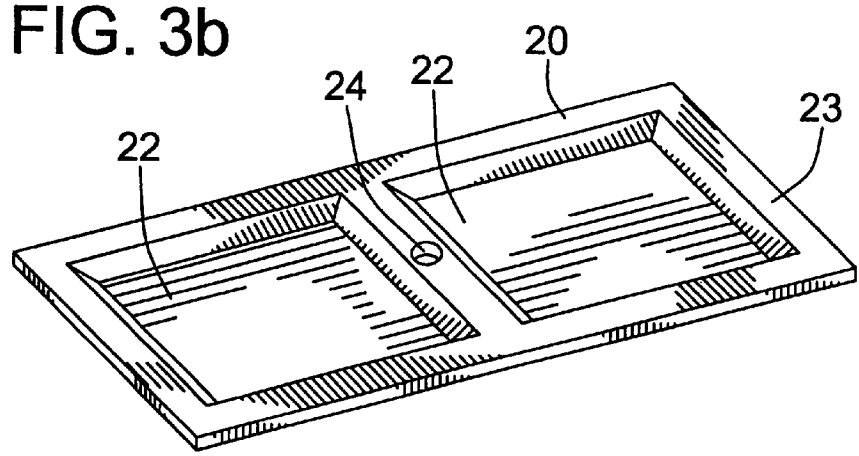
Figure 3C:
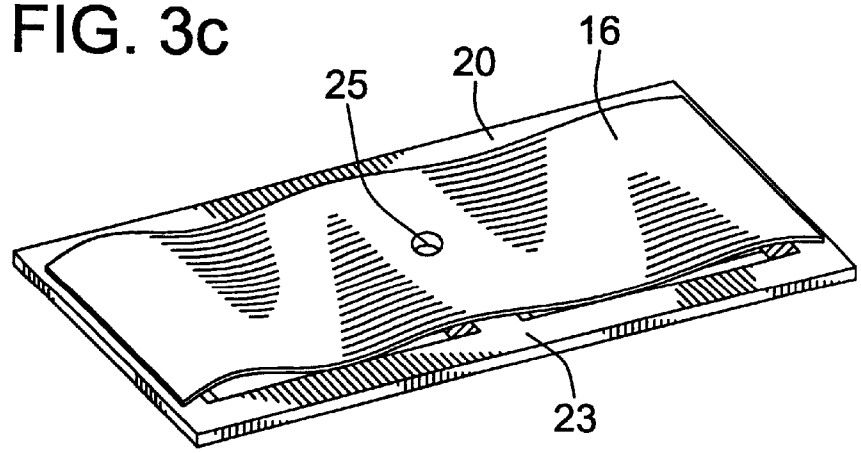

As shown in FIG. 3b, two generally symmetrical recesses 22 are formed in the blank 20 by drawing or punching. These recesses are sufficiently deep, considering the thickness of the blank 20, to provide an interior volume in the capacitor for housing the internal parts of the capacitor. The edge of the blank includes a peripheral flange 23 extending entirely around the edge of the blank 20. Most preferably, the recesses 22 are identical in size and shape and are symmetrically placed in the blank with respect to a center line between the two recesses and along which the blank will be folded to place one recess opposite the other. A hole 24 is punched through the blank along that line where the blank 20 will be folded in subsequent processing.

Although not susceptible to clear illustration in FIGS. 3a and 3b, the side of the blank 20 that will become the interior surface of the capacitor is coated with a porous metal oxide from the group listed above, preferably ruthenium oxide. The coating process can occur before or after the recesses 22 are formed and before or after the hole 24 is punched. Most preferably, the coating is first formed, the recesses are then formed, and, finally, the hole 24 is punched.

After the preparation of the blank 20, the separator 16 is placed on the surface of the blank with the coating. The separator 16 includes a hole 25 aligned with the hole 24 in the blank 20.

Figure 3D:
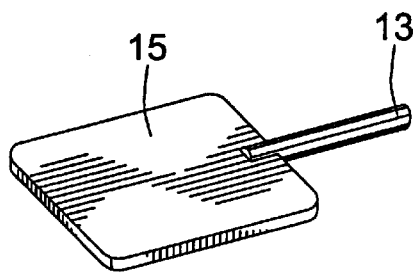
Figure 3E:
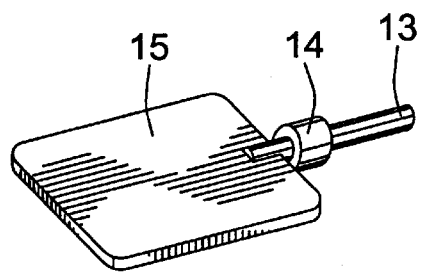

In a separate process, the valve metal anode 15 is prepared for assembly of the capacitor. As shown in FIG. 3d, the valve metal anode 15 has a size small enough to be received in the recesses 22. Preferably, the anode 15 is similar in shape to the recesses 22, which are preferably identical in size and shape, so that the anode fits snugly, with the separator, in volumes 12 of the completed capacitor 1. The lead 13 is attached, for example, by welding, to the anode 15.

Either before or after the lead 13 is attached to the anode 15, the lead 13 is inserted through a hole extending through the elastomeric body 14. The hole in the elastomeric body 14 is small enough to provide a seal to the lead 13 for preventing the escape of electrolyte from the completed capacitor. The elastomeric body 14 is placed near the junction of the lead 13 and the anode 15.

Figure 3F:
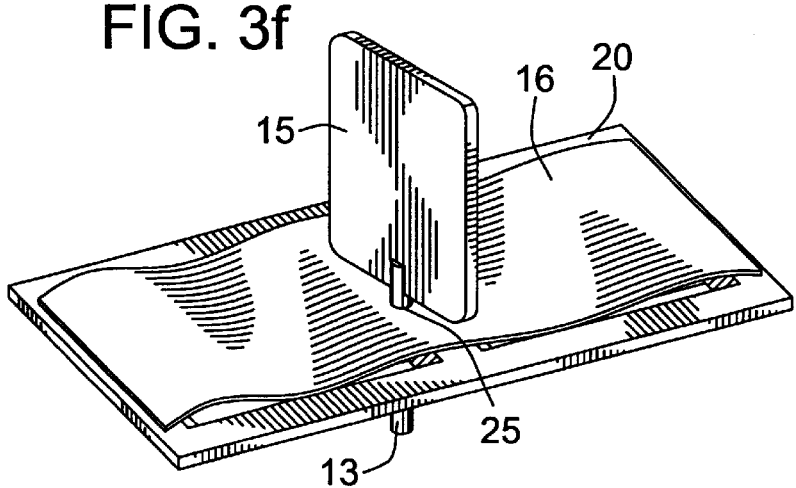

In the next assembly step, illustrated in FIG. 3f, the lead 13 is inserted through the aligned holes 25 and 24 in the separator 16 and the blank 20. The elastomeric body 14 is compressed, if necessary, for its insertion partially through the hole 23. Although not so illustrated, the wire 13 is preferably inserted through the hole 25 of the separator before the elastomeric body 14 is placed on the wire 13. The elastomeric body 14 may be placed on the wire 13 before the wire is inserted through the hole 24 in the blank or afterwards. In either case, the elastomeric body is placed in the hole 24 to form the seal with the metal blank in the subsequent folding step. The hole 24 may be smaller than the relaxed outside diameter of the elastomeric body 14 to enhance the electrolyte-tight seal that is formed between the blank 10 and the elastomeric body 14 when the blank is folded.

Figure 3G:
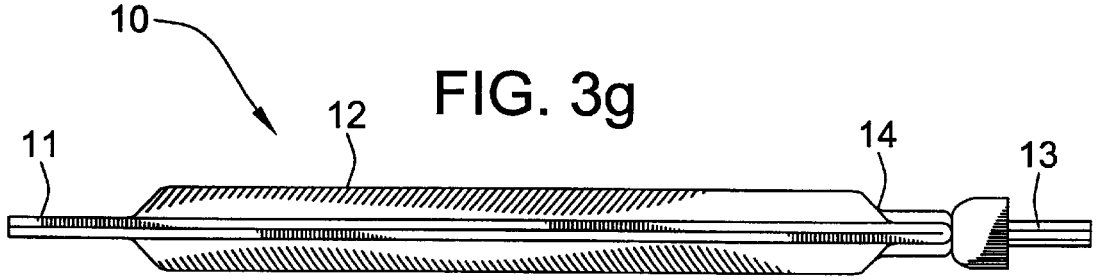

Either at this stage, when the separator 16 is first put in place, or just before folding the blank 20 as described below, the electrolyte 17 is added by applying it to the separator and/or in the recesses 22. As illustrated in FIG. 3g, the blank 20 is folded along an imaginary line extending between and spaced from the recesses 22 and intersecting the hole 24 so that the separator 16 and the anode 15 are received in the recesses 22 and surfaces of the peripheral flange 23 of the blank 20 around the recesses 22 are brought into mutual contact.

The package of the capacitor is completed by welding the surfaces of the flanges 23 that are brought in contact by the folding step to form a hermetic seal around three sides of the illustrated embodiment of the capacitor. No sealing is needed at the fourth side where the metal foil is folded. The crimping of the elastomeric body 14 that occurs when the blank is folded forms an electrolyte-tight seal between the body and the case. Further crimping may be done, proximate the body 14 but has not proven necessary. In addition, experience has shown that the seal formed between the metal foil of the case 10 and the elastomeric body 14 is maintained during the welding process and thereafter. The result of this final step is the capacitor illustrated in FIG. 1. Examples of such capacitors that have been constructed have demonstrated high energy storage densities. Considering the thickness of the capacitor, the energy stored per unit volume of these capacitors is about 2 J/cm$^3$ for a 50 volt cell. The total thickness of the capacitor was no more than 1.5 mm so that the capacitor can be properly characterized as flat. Considering the anode assembly as two parts, the capacitor includes only four elements.

FIGS. 4a and 4b illustrate an alternative embodiment of a capacitor according to the invention. FIG. 4a corresponds to FIG. 3d and the second step of the assembly process illustrated with respect to FIGS. 3a–3g. In FIG. 4a, the blank 20 includes only a single recess 22', rather than the pair of recesses 22 illustrated in FIG. 3b. The single recess includes a hole 24'. Otherwise, the steps in the assembly process are the same as those illustrates in FIGS. 3a and 3c–3f. The package shape resulting from a blank having only a single recess is somewhat different from the package illustrated in FIG. 3g. The location of the fold of the blank in the completed package is aligned with extremities of the volumes 12 at the side of the package from which the lead 13 protrudes. Since there are no contacting surfaces of the blank adjacent to the elastomeric body 14, it may be necessary to crimp at least part of the fold proximate the elastomeric body 14 to ensure that a proper seal is formed between the case and the body 14, preventing loss of electrolyte from inside the capacitor.

While the invention has been described with respect to certain preferred embodiments, the invention encompasses all modifications and additions of the described embodiments that would occur to those of skill in the art from the foregoing description.

What is claimed is:

1. A method of making a capacitor comprising:

providing a metal foil blank having an inside surface, an outside surface, and at least one edge;

forming two substantially similar recesses on the inside surface of the metal foil blank, leaving a peripheral flange surrounding the recesses at the edge of the metal foil blank;

before or after forming the recesses, coating the inside surface of the metal foil blank with a coating for forming an electrode of a capacitor;

before or after applying the coating, forming a hole in the metal foil blank spaced from the edge and between the two recesses;

placing an ion-permeable separator on the inside surface of the metal foil blank;

before or after placing the ion-permeable separator on the inside surface of the metal foil blank, adding an electrolyte to the separator;

preparing an assembly of a substantially planar anode having an area no larger than the area of the two substantially similar recesses and a lead connected to the anode;

inserting the lead through the separator and the hole;

placing a resilient body on and surrounding part of the lead proximate the anode and inserting the body into the hole in the metal foil blank;

folding the metal foil blank and the separator along a line intersecting the hole and lying between the two recesses so that, after folding of the metal foil blank and the separator, the anode is sandwiched between respective parts of the separator, the separator is in contact with the coating on the inside surface of the metal foil blank in the recesses, and parts of the peripheral flange of the metal foil blank are in contact with each other; and sealing the parts of the peripheral flange of the metal foil blank that are in contact with each other to form a hermetically sealed metal foil case.

2. The method according to claim 1 wherein the metal foil blank is a metal chosen from the group consisting of tantalum, aluminum, stainless steel, nickel, titanium, niobium, and zirconium.

3. The method according to claim 1 wherein coating the inside surface of the metal foil blank comprises coating the inside surface of the metal foil blank with a porous coating including an oxide of a metal selected from the group consisting of ruthenium, iridium, nickel, rhodium, platinum, palladium, and osmium.

4. The method according to claim 1 including forming the anode by sintering a powder of a metal selected from the group consisting of tantalum, aluminum, niobium, zirconium and titanium and electrolytically forming an oxide coating on the sintered powder.

5. A method of making a capacitor comprising:

providing a metal foil blank having an inside surface, an outside surface, and at least one edge;

forming a recess on the inside surface of part of the metal foil blank, leaving a peripheral flange surrounding the recess;

before or after forming the recess, coating the inside surface of the metal foil blank with a coating for forming an electrode of a capacitor;

before or after applying the coating, forming a hole in the metal foil blank spaced in the recess;

placing an ion-permeable separator on the inside surface of the metal foil blank;

before or after placing the ion-permeable separator on the inside surface of the metal foil blank, adding an electrolyte to the separator;

preparing an assembly of a substantially planar anode having an area no larger than one-half the area of the recess and a lead connected to the anode;

inserting the lead through the separator and the hole;

placing a resilient body on and surrounding part of the lead proximate the anode and inserting the body into the hole in the metal foil blank;

folding the metal foil blank and the separator along a line intersecting the hole so that the anode is sandwiched between respective parts of the separator, the separator is in contact with the coating on the inside surface of the metal foil blank in the recess, and parts of the peripheral flange of the metal foil blank are in contact with each other; and sealing the parts of the peripheral flange of the metal foil blank that are in contact with each other to form a hermetically sealed metal foil case.

6. The method according to claim 5 wherein the metal foil blank is a metal chosen from the group consisting of tantalum, aluminum, stainless steel, nickel, titanium, niobium, and zirconium.

7. The method according to claim 5 wherein coating the inside surface of the metal foil blank comprises coating the inside surface of the metal foil blank with a porous coating including an oxide of a metal selected from the group consisting of ruthenium, iridium, nickel, rhodium, platinum, palladium, and osmium.

8. The method according to claim 5 including forming the anode by sintering a powder of a metal selected from the group consisting of tantalum, aluminum, niobium, zirconium, and titanium and electrolytically forming an oxide coating on the sintered powder.

* * * * *